Nov. 2, 1926.  
J. H. SHAPLEIGH  
1,605,004  
PROCESS FOR THE MANUFACTURE OF OLEUM  
Filed Feb. 3, 1926
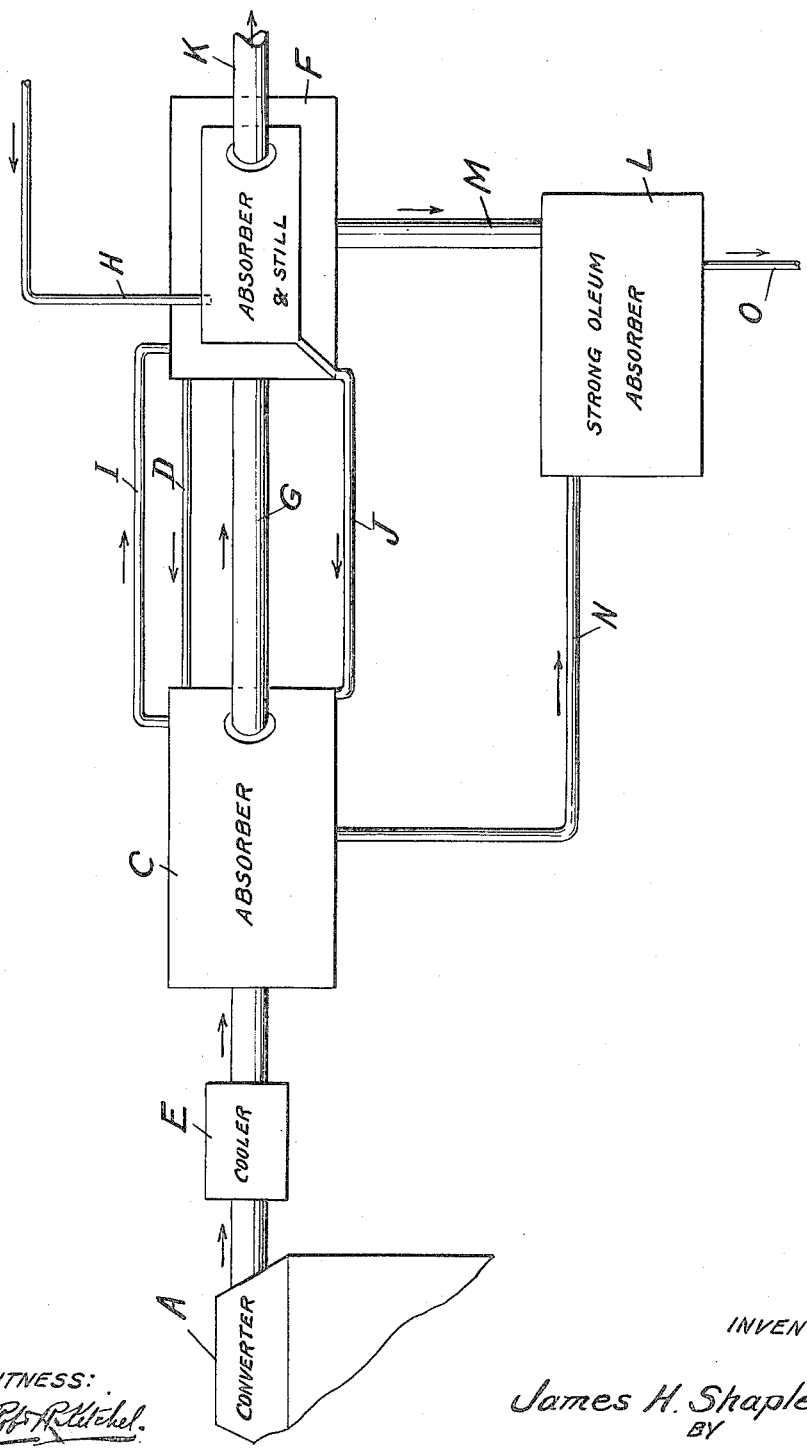
WITNESS:
INVENTOR  
James H. Shapleigh  
BY  
ATTORNEYS.

Patented Nov. 2, 1926.

1,605,004

UNITED STATES PATENT OFFICE.

JAMES H. SHAPLEIGH, OF MOUNTAIN LAKES, NEW JERSEY, ASSIGNOR TO HERCULES POWDER COMPANY, OF WILMINGTON, DELAWARE, A CORPORATION OF DELAWARE.

PROCESS FOR THE MANUFACTURE OF OLEUM.

Application filed February 3, 1926. Serial No. 85,657.

My invention relates to a novel process for the manufacture of oleum.

As is well known, oleum is the name applied to a strength of sulphuric acid which has sulphur trioxide gas in excess of that amount required to combine with the water present to make 100% acid. It is a "fuming" acid and may consist of only a fraction of a percent of from a fraction of a precent to one hundred percent sulphur trioxide.

Various different strengths of oleum contain definite percentages of free sulphur trioxide and exert definite vapor pressures at a given temperature, the vapor pressure exerted by any given strength of oleum increasing with increase in temperature.

Hence it has been recognized as essential in any process of making oleum, that the sulphur trioxide gas used to charge the acid, and thereby produce fuming acid, must be of a strength or, preferably, must have a vapor pressure higher than that of the oleum in process of manufacture.

Thus for producing 20% oleum ordinary gas strengths, as known in the art, are sufficient. For the production of 40%–45% oleum, however, extremely high gas strengths are required and as a result its manufacture involves extreme conditions in plant operation. For example, 20% oleum may be readily produced with the use of a 7% $SO_3$ gas, whereas for the production of 45% oleum a 9%–11% $SO_3$ gas is used. Similarly, higher strengths of oleum, as for example 65% oleum, require much higher $SO_3$ gas strengths.

Heretofore in the manufacture of high strength oleum, say oleum of 65%, it has been customary to first produce a 20% oleum by the usual process and then heat it in direct-fired stills to drive off practically 100% $SO_3$ gas for use in the manufacture of the 65% oleum by a separate operation.

Now it is the object of my present invention to provide a process by the practice of which high strength oleum may be produced in the normal system and with the use of $SO_3$ gases as low as 5% and which will permit of the continuous production of high strength oleum without the necessity of supplying extraneous heat.

The process embodying my invention in its basic form involves a utilization of the heat of absorption of $SO_3$ gas in 98% acid for the liberation from 20% oleum of 100% $SO_3$ gas which is then absorbed in acid for the production of the high strength oleum.

More particularly the process embodying my invention involves the production in a converter of, for example, 7% $SO_3$ gas which is passed direct from the converter, through proper cooling devices, in contact with 20% oleum, into which is fed weaker acid. A portion of the 7% $SO_3$ gas is absorbed by the weaker acid which results in the production of 20% oleum, the 20% oleum being kept cool by suitable means so that the maximum charge takes place. The residual 7% $SO_3$ gas, that is such as is not absorbed by the weaker acid, is absorbed to produce 98% acid, with, as is usual the generation of considerable heat. The 20% oleum is brought into indirect contact, or heat interchange relation, with the hot 98% acid, in for example, a two compartment apparatus, or still, having adequate heat transfer surface, which results in cooling of the 98% acid and liberating the excess $SO_3$ from the 20% oleum as practically 100% $SO_3$. The 100% $SO_3$ gas thus obtained is then directed into contact with other acid in a suitable absorber for the production of high strength oleum. The operation of the absorber wherein the 100% $SO_3$ gas is absorbed in the production of high strength oleum may be carried on in different ways. For example, the absorber, heat interchange apparatus, or still and lines may, on starting, be completely filled with 20% oleum, thereby excluding all air, and a partial vacuum produced by the removal from the absorber and lines of some of the oleum. Then as heat exchange occurs in the still the $SO_3$ driven from the 20% oleum is attracted by the vacuum and absorption proceeds and tends to preserve the vacuum in such form as to have the $SO_3$ partial pressure equal to the oleum vapor pressure.

The operation of the absorber, of for example, the tower type with the absorbing acid in circulation, may be promoted by passing a portion of the 7% $SO_3$ gas into the exit line from the still, thereby producing motion and an $SO_3$ gas immaterially diluted from 100% by the 7% gas.

Still another way by which the operation of the high strength oleum absorber may be promoted is to utilize the pressure of the heat interchange or still for producing the required movement of the $SO_3$ gas to the absorber.

In the operation of the absorber under partial vacuum, the absorber is the final unit of the apparatus, but when the absorber is operated by the use of 7% $SO_3$ gas or from utilization of the pressure in the still there is necessarily a discharge of gas from the absorber requiring further absorption. However, it is evident that the gas discharged from the absorber is high strength gas and on absorption will produce high strength oleum.

In the carrying out of my process the spent oleum or that from which the $SO_3$ gas is removed in the heat interchange, or still, and containing approximately zero percent free $SO_3$, is returned to the 20% oleum absorber and provides a supply of weak acid thereto as does also the make of 98% acid. This oleum acts as a carrier for the $SO_3$ and is in constant circulation between the 20% oleum absorber and the still. The make from the 20% oleum absorber, due to the strengthening of the make of 98% acid flows to the strong oleum absorber for final charging.

Thus the path of the acid is from 98% acid, to 20% oleum, to strong oleum. The path of the gas is from the converter to 20% oleum absorber whence a portion goes to the 98% absorber. A part of the gas absorbed in the 20% oleum is liberated in the still and goes to the high strength oleum absorber.

While the carrying out of the process embodying my invention is not dependent upon any particular apparatus, I will now describe a suitably arranged apparatus for carrying out the process, with reference to the accompanying drawing in which a suitable arrangement of apparatus has been illustrated diagrammatically.

A indicates a converter in which is produced $SO_3$ gas, of say 7%, which passes through a conduit B to an absorber C which contains 20% oleum and to which weak acid passes through a pipe D. The $SO_3$ gas passing through conduit B is cooled by means of a cooler E through which the conduit passes.

F indicates a two compartment device the inner compartment of which acts as a 98% acid absorber, being supplied with unabsorbed or residual $SO_3$ from the 20% oleum absorber C through a conduit G and with a suitable diluent, as water in some form, through a pipe H. The outer compartment of the device F receives 20% oleum from the absorber C through a pipe I. The inner compartment of the absorber F is connected to the absorber C by a pipe J, through which passes the make of 98% acid, and with atmosphere by a conduit K, which carries off exit gas from which the $SO_3$ has been removed.

The device F acts as a heat interchange or still in that the heat generated by the absorption in producing 98% acid in the inner compartment is transmitted to the 20% oleum in the outer compartment, with the result that the 98% acid is cooled and 100% $SO_3$ gas is liberated from the 20% oleum.

The 100% $SO_3$ gas liberated in the outer compartment of the device F is led to a high strength oleum absorber L through a conduit M. The absorber L is supplied with 20% oleum from the absorber C through a pipe N, while the make of high strength oleum is led from the absorber L through a pipe O.

From observation of the drawing it will be observed that the $SO_3$ gas from the converter A is led to the 20% oleum absorber C, a part being led on, through conduit G, to the inner compartment of the device F where it is utilized for the production of 98% acid, the make of which is led through pipe J back to the absorber C and affords a supply of weak acid for the production of 20% oleum. A part of the 20% oleum produced in absorber C is led through pipe I, to the outer compartment of device F, wherein the $SO_3$ is liberated, and a part is led through pipe N to the high strength oleum L. The $SO_3$ liberated in the outer compartment of device F is led through conduit M to the absorber L and the spent oleum is returned, through pipe D, to the absorber C.

Thus it will be observed that high strength oleum is produced from low strength $SO_3$ gas through fractionation of low strength oleum without the utilization of extraneous heat, while at the same time producing the necessary acid for the production of the low strength oleum and the low strength oleum for the production of the high strength oleum.

I claim—

1. The process of manufacturing relatively high strength oleum, which includes utilizing the heat of absorption of relatively weak $SO_3$ gas in a diluent to release relatively strong $SO_3$ gas from a relatively weak oleum and absorbing released $SO_3$ gas in relatively weak oleum.

2. The process of manufacturing relatively high strength oleum, which includes passing a relatively weak oleum in heat interchange relation with $SO_3$ gas and a diluent and absorbing in relatively weak oleum $SO_3$ gas released from the oleum by the heat generated on the absorption of the $SO_3$ gas by the diluent.

3. The process of manufacturing relatively high strength oleum, which includes producing acid by absorption of $SO_3$ gas, producing relatively low strength oleum by absorption of $SO_3$ gas in the acid produced utilizing the heat generated in the production of the acid to release $SO_3$ gas from relatively low strength oleum produced and absorbing $SO_3$ gas released in relatively low strength oleum.

4. The process of manufacturing relatively high strength oleum, which includes producing weak acid by the absorption of relatively weak $SO_3$ gas in a diluent, producing relatively weak oleum by absorption of relatively weak $SO_3$ gas in weak acid produced, passing relatively weak oleum in heat interchange relation with the relatively weak $SO_3$ gas and the diluent and absorbing relatively strong $SO_3$ gas released from the relatively weak oleum by the heat generated by the absorption of the relatively weak $SO_3$ gas in the diluent in relatively weak oleum.

5. The process of manufacturing relatively high strength oleum which includes passing relatively weak $SO_3$ gas through an absorber containing weak acid for the production of relatively weak oleum, passing the unabsorbed $SO_3$ gas into an absorber containing a diluent for the production of weak acid, utilizing the make of weak acid as a supply for the production of the relatively weak oleum, subjecting relatively weak oleum to the heat generated in the production of the weak acid for the release of relatively strong $SO_3$ gas. absorbing relatively strong $SO_3$ gas released in relatively weak oleum and utilizing the make of relatively weak oleum for absorption of the relatively strong $SO_3$ gas.

6. The process of manufacturing relatively high strength oleum, which includes producing relatively low strength oleum and weak acid by absorption of $SO_3$ gas. utilizing the heat of absorption for the elimination of $SO_3$ gas from the weak oleum and absorbing elimination $SO_3$ gas in relatively weak oleum, in an apparatus under partial vacuum.

7. The process of manufacturing relatively high strength oleum, which includes producing relatively low strength oleum and weak acid by absorption of $SO_3$ gas, passing relatively weak oleum in heat interchange relation with the weak acid and absorbing $SO_3$ gas eliminated by heat from the weak oleum in relatively weak oleum.

8. The process of manufacturing relatively high strength oleum which includes producing relatively low strength oleum and weak acid by absorption of $SO_3$ gas, passing a portion of the relatively weak oleum in heat interchange relation with the weak acid for the elimination of $SO_3$ gas and absorbing eliminated $SO_3$ gas in relatively weak oleum.

9. The process of manufacturing relatively high strength oleum, which includes producing relatively low strength oleum and weak acid by absorption of $SO_3$ gas, passing a portion of the relatively weak oleum in heat interchange relation with the weak acid for the elimination of $SO_3$ gas and returning the spent oleum for reabsorption of $SO_3$ gas and absorbing eliminated $SO_3$ gas in the make of relatively low strength oleum.

10. The process of manufacturing relatively high strength oleum, which includes producing relatively low strength oleum and weak acid by absorption of relatively weak $SO_3$ gas, passing relatively weak oleum in heat interchange relation with the weak acid containing heat of absorption for the elimination of relatively strong $SO_3$ gas and absorbing relatively strong $SO_3$ gas eliminated in relatively weak oleum.

11. The process of manufacturing relatively strong oleum, which includes producing a relatively weak oleum by absorption of relatively weak $SO_3$ gas in a diluent, fractionating the relatively weak oleum under the influence of the heat of absorption for the production of a relatively strong $SO_3$ gas and absorbing the strong $SO_3$ gas in relatively weak oleum.

12. The process of manufacturing relatively strong oleum, which includes circulating $SO_3$ gas in an apparatus for the production of weak acid and relatively weak oleum by absorption, circulating weak oleum produced in heat interchange relation with the weak acid for the elimination of strong $SO_3$ gas and absorbing the strong $SO_3$ gas eliminated in weak oleum produced.

13. The process of manufacturing relatively strong oleum, which includes continuously producing relatively low strength oleum by absorption of $SO_3$ gas in a diluent fractionating strong $SO_3$ gas from a part of said relatively low strength oleum under the influence of the heat of absorption and absorbing the fractionated $SO_3$ gas in another part of said low strength oleum.

14. The process of manufacturing relatively high strength oleum, which includes continuously producing weak acid and relatively low strength oleum, continuously effecting heat interchange between the weak acid and a part of the low strength oleum with the elimination of strong $SO_3$ gas and continuously producing high strength oleum by absorption of the strong $SO_3$ gas in weak oleum.

15. The process of manufacturing relatively high strength oleum, which includes continuously producing weak acid and relatively low strength oleum, continuously effecting heat interchange between the weak acid and a part of the low strength oleum with the elimination of strong $SO_3$ gas and continuously producing high strength oleum by absorption of the strong $SO_3$ gas in the make of weak oleum.

16. The process of manufacturing relatively high strength oleum, which includes continuously producing weak acid by absorption of relatively weak $SO_3$ gas, continuously producing relatively weak oleum by absorption of relatively weak $SO_3$ gas in the make of weak acid continuously circulating relatively weak oleum produced in heat interchange relation with the weak acid for the elimination of strong $SO_3$ gas and continuously producing relatively strong oleum by absorption of the relatively strong $SO_3$ gas in the make of relatively weak oleum.

In testimony of which invention, I have hereunto set my hand.

JAMES H. SHAPLEIGH.